United States Patent [19]
Townsend

[11] Patent Number: 5,304,432
[45] Date of Patent: Apr. 19, 1994

[54] MEMBRANE FLOW CELL BATTERY

[75] Inventor: Carl W. Townsend, Los Angeles, Calif.

[73] Assignee: Hughes Aircraft Company, Los Angeles, Calif.

[21] Appl. No.: 959,587

[22] Filed: Oct. 13, 1992

[51] Int. Cl.$^5$ .......................................... H07M 10/36
[52] U.S. Cl. .......................................... 429/50; 429/105
[58] Field of Search ........................ 429/7, 15, 50, 105

[56] References Cited

U.S. PATENT DOCUMENTS

| | | | |
|---|---|---|---|
| 3,338,746 | 8/1967 | Plust et al. ................................. | 429/9 |
| 4,093,527 | 6/1978 | Tanno et al. ............................... | 429/105 X |
| 4,343,868 | 8/1982 | Putt ............................................ | 429/105 X |
| 4,783,381 | 11/1988 | Tytgat et al. ............................. | 429/10 |

Primary Examiner—Stephen Kalafut
Attorney, Agent, or Firm—M. E. Lachman; M. W. Sales; W. K. Denson-Low

[57] ABSTRACT

A rechargeable membrane flow cell battery useful for providing electrical power to electric loads. The rechargeable membrane flow cell battery includes a bipolar stack of at least two membrane flow cells and a single fuel cell electrode pair for converting membrane potentials generated by acidic and basic electrolyte ions to electrical potential. The ability to stack numerous membrane flow cells provides for increases in the energy density of the battery. The presence of a single electrode pair reduces activation polarization and decreases the cost and weight of the battery. Rapid recharging is accomplished by draining spent fluid and providing fresh electrolyte fluids. Conventional recharging is accomplished by reversing the fluid flows and applying electrical power, to regenerate the electrolytes.

20 Claims, 2 Drawing Sheets

MEMBRANE FLOW CELL BATTERY

BACKGROUND OF THE INVENTION

1. Field the Invention

The present invention relates generally to ion membrane flow cell batteries for generating electrical potential. More particularly the present invention involves rechargeable batteries wherein membrane potentials generated by ions moving across ion membranes located in a stacked series of ion membrane flow cells are converted to electrical current and voltage by a single electrode pair.

2. Description of Related Art

Batteries which provide electrical voltage for utility load leveling and powering electric vehicles and spacecraft instrumentation have been the subject of intensive research for decades. In particular, efforts have been directed toward providing batteries having higher energy densities and higher power densities. Increased battery energy density contributes to increased vehicle driving range between battery recharging. On the other hand, increased power density provides improved vehicle acceleration and high speed driving. Thus, batteries used to power drive train motors are benefitted by high energy densities and power densities.

Electric vehicles and other drive train motors currently in use typically are powered by lead-acid batteries. One problem associated with these batteries is their limited cycle life when used under deep discharge conditions. Further, since the structural components of these batteries are metal, they are prone to corrosion. Also, the metal contained in the lead-acid voltage generating system contributes to high battery weights.

Additionally, lead-acid batteries contain numerous cells and incorporate an electrode pair for each cell. For many applications, multi-cell batteries having an electrode pair for each cell are needed to generate the power and current densities required for powering, for example, electric vehicles.

A significant problem associated with multi-cell batteries is that provision must be made for the conduction of electric current from one cell to the next. In lead-acid batteries, substantial amounts of lead are provided solely for current conduction. This lead contributes substantial weight and does not contribute useful energy. An additional problem associated with battery electrodes involves activation polarization, a voltage loss due to the process of changing electronic flow into ionic flow. Unfortunately, since multi-cell batteries have numerous electrode pairs, they exhibit substantial amounts of activation polarization and decreased cycle lives. The presence of numerous electrode pairs also contributes to decreased battery efficiency, decreased power density and decreased current density.

It would be desirable to provide a battery in which multiple, heavy internal current conductors are not needed. It would also be desirable to provide corrosion resistant batteries which exhibit decreased amounts of activation polarization. Further, it would be desirable to provide batteries having increased cycle lives while being capable of developing power densities and energy densities sufficiently high to power vehicles having acceptable acceleration, high speed and range.

SUMMARY OF THE INVENTION

The present invention provides a lightweight rechargeable corrosion resistant battery exhibiting decreased amounts of activation polarization and increased cycle life while being capable of developing power densities and energy densities sufficiently high to power vehicles having acceptable acceleration, high speed and range.

The present invention is based upon the discovery that two or more membrane flow cells can be arranged to form a stack of membrane flow cells, each of which includes a series of ionic membranes positioned between liquid flow channels. By causing charged species to migrate across the ionic membranes, charge imbalances within the liquid flow channels can be produced, generating membrane potentials. As a feature of the present invention, the rechargeable battery of the present invention utilizes a single electrode pair to convert the membrane potentials to electrical voltage. Advantageously, the ability to provide a rechargeable multi-cell battery which incorporates a single electrode pair eliminates the traditional requirement of one electrode pair for each battery cell. Accordingly, problems associated with electrode activation polarization, internal current conductors and short cycle life are minimized. Further, since many membrane cells can be stacked within the battery, the battery of the present invention can provide power densities and energy densities sufficient to power vehicles having acceptable acceleration, speed and range.

More particularly, the present invention provides a rechargeable battery for generating voltage by acidic and basic electrolytic fluids flowing between membranes. The battery includes a stack of at least two membrane flow cells, each of which includes a plurality of ionic membranes which separate fluid flow channels. At least one fluid flow cell includes separate acidic and basic electrolyte flow channels separated by a bilayer membrane. Separate salt solution flow channels are positioned adjacent each electrolyte flow channel and separated from each electrolyte flow channel by an ion membrane.

A cathode compartment wherein hydrogen ion is converted to hydrogen gas is positioned at a first end of the stack of flow cells and includes a cathode, cathode fluid flow channel, and a portion of an adjacent salt solution flow channel. Similarly, an anode compartment wherein hydrogen gas is consumed to form electrical potential, is positioned at a second end of the stack of flow cells and includes an anode, anode fluid flow channel, and a portion of an adjacent salt solution flow channel. In the rechargeable battery's simplest configuration, each separate salt solution flow channel referred to above, forms part of the battery anode compartment and the battery cathode compartment, respectively. In preferred embodiments in which the battery includes more than two flow cells, as described below, the separate salt solution flow channels form part of an adjacent membrane flow cell. When multiple membrane flow cells are stacked, the cathode compartment and anode compartment are each located at an end of the stack of membrane flow cells as described above.

In accordance with the present invention, in operation, flowing acidic electrolyte fluids and flowing basic electrolyte fluids provide ionic species which selectively migrate through the appropriate ion membranes, forming charge imbalances which in turn provide membrane potentials within the cells. The electrodes convert the potentials to electrical voltage and current. Salt solution, formed by combining migrating electrolyte ions, is stored for later conversion back to the acidic electrolyte fluid and basic electrolyte fluid to be utilized again in the battery.

Preferably the acidic electrolyte fluid and basic electrolyte fluid are stored separately from the series of membrane flow cells in external reservoirs. On demand, the acidic and basic fluids are transferred to the appropriate fluid flow channels for generating electricity. Additionally, the salt and solvent are transferred to a reservoir for later regeneration of the acidic fluids and basic fluids. Conveniently, the regenerated acidic fluids and basic fluids are available for pumping to the external reservoirs and then transferring to the appropriate fluid flow channels for generating electricity.

The above-described and many other features and attendant advantages of the present invention will become better understood by reference to the following detailed description when taken in conjunction with the accompanying drawings.

DESCRIPTION OF THE PREFERRED EMBODIMENTS

The rechargeable battery of the present invention is especially well-suited for supplying electrical current to electric motors such as those used to power electric vehicles. Even though the rechargeable battery of the present invention includes more than one cell, the battery incorporates only a single electrode pair. By eliminating the requirement for an electrode pair for each cell, the rechargeable battery of the present invention minimizes weight and electrode activation polarization and the resulting decrease in voltage. Additionally, the ability to stack a series of cells, simultaneously results in increased battery power density and energy density.

Although the rechargeable battery provided by the present invention is particularly well-suited for powering electrical vehicles, it will be understood by those skilled in the art that the rechargeable battery is useful for providing electrical voltage to electrical loads in a variety of applications. Accordingly, the battery of the present invention is not limited to use in connection with electrically powered vehicles, and other applications are within the scope of the present invention. For example, the rechargeable battery of the present invention is suitable for powering equipment utilized in spacecraft and for utility load leveling applications.

Figure 1:
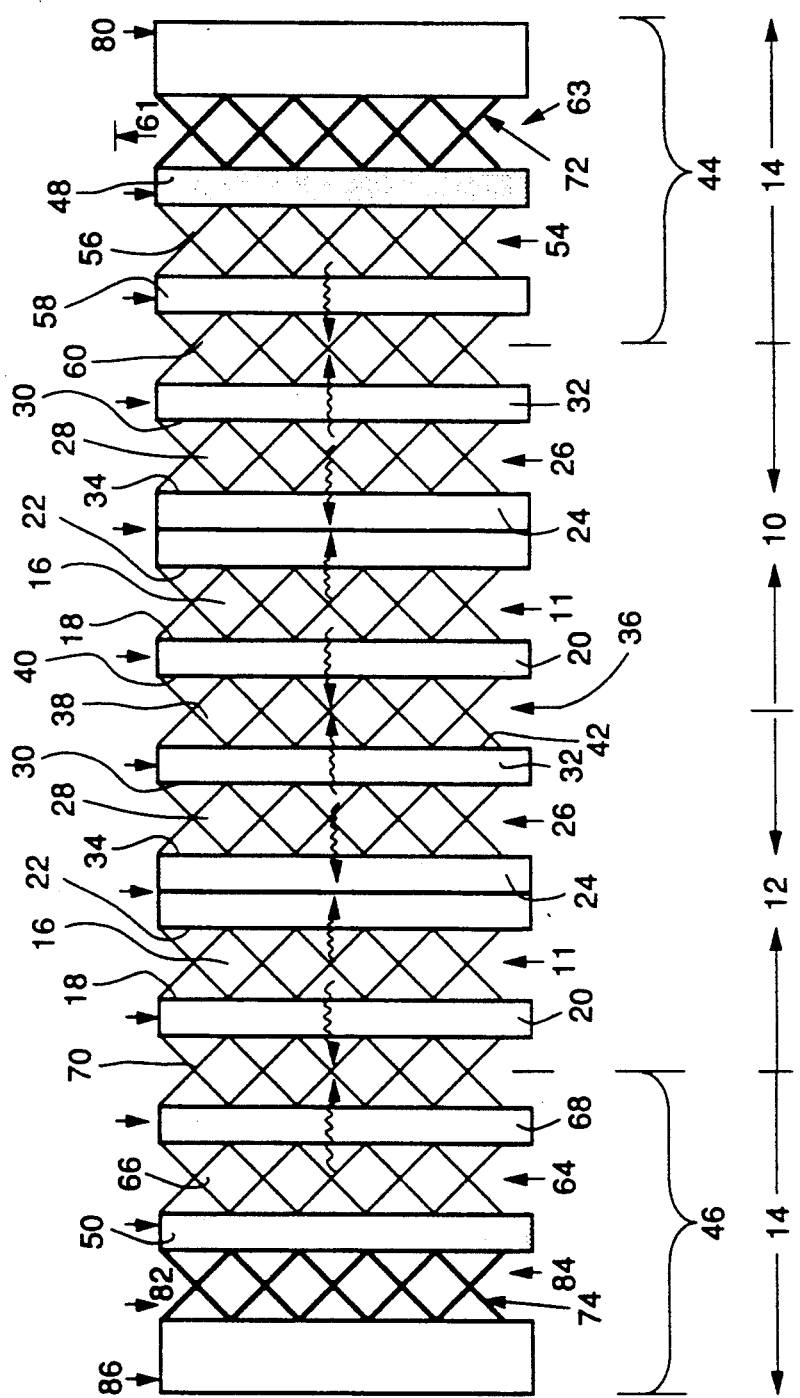
FIG. 1 is a diagrammatic view of an exemplary membrane flow cell battery illustrating the stacked series of membrane cells and a single electrode pair in accordance with the present invention.

The following discussion is made with reference to FIG. 1, a diagrammatical illustration of a preferred battery of the present invention. The battery of FIG. 1 includes a stack of three membrane flow cells 10, 12, 14, wherein ionic charges moving across ion membranes form membrane potentials. These ion membranes are typically derivatized polymeric membranes and are available commercially from numerous suppliers including E. I. duPont of Wilmington, Del., Dow Chemical of Midland, Mich., and RAI of Hauppauge, N.Y. For purposes of the present invention bilayer membrane shown at numeral 24 is a laminate of two ion membranes and formed by laminating a cation membrane and an anion membrane. These bilayer anion-cation membranes are available from Union Resources and Technology, Inc. of Whitehouse, N.J., and from Allied Chemical Co.

The two central membrane flow cells 10, 12 are identical and each includes an acidic electrolyte inlet 11 through which acidic electrolyte is introduced into an acidic fluid flow channel 16 formed by a first surface 18 of an anionic membrane 20 and a cation surface 22 of bilayer membrane 24. The acidic electrolyte is in fluid form and is a working fluid within each membrane potential cell. Suitable acids are those which are fluids or acids having solubility in a suitable solvent and which are non-oxidizing. Preferably the acidic electrolyte is a solution of an acid and solvent. Suitable acids include a variety of Bronsted acids such as the hydrohalide acids, including HCl, HBr, HI, HF (and mixtures of HF and antimony pentafluoride), acids belonging to the group consisting of sulfuric acid, trifluoromethanesulfonic acid, carboxylic acids, and phosphonic acids, including pyrophosphoric acid, phosphorous acid, and phosphoric acid. Suitable solvents for incorporating in electrolyte solutions include those solvents which are stable with respect to the acid. Preferably, and as discussed in more detail below, the solvent is water.

The battery of FIG. 1 further includes a basic electrolyte inlet 26 through which basic electrolyte fluid is introduced into a basic fluid flow channel 28 formed by a first surface 30 of cation membrane 32 and an anion surface 34 of bilayer membrane 24. The basic electrolyte is in fluid form and is a working fluid within the membrane potential cells. Suitable bases are those which are fluids or bases having solubility in a suitable solvent and which are non-oxidizing. Preferably, the basic electrolyte is in the form of a solution of a basic compound and solvent. Accordingly, suitable bases include sodium hydroxide, potassium hydroxide, sodium ethoxide, and sodium methoxide. As discussed in more detail below, a preferred solvent is water.

Membrane flow cells 10, 12 share a salt solution outlet 36 through which salt solution is transferred from a salt solution flow channel 38 formed by a second surface 40 of said anion membrane 20 and a second surface 42 of said cation membrane 32. The salt solution is the third working fluid within the membrane potential cells and is formed by the interaction of anions supplied by the acidic electrolyte and cations supplied by the basic electrolyte.

The third membrane flow cell 14 is provided by cathode compartment 44 wherein hydrogen gas is generated by fuel cell cathode 48, and anode compartment 46 wherein hydrogen gas is consumed by fuel cell anode 50. Cathode 48 and anode 50 can be any fuel cell hydrogen electrode pair such as those supplied by E-TEK, Inc. of Framingham, Mass.

The cathode flow compartment 44 is located at one end of the bipolar stack of membrane flow cells and includes a cathode electrolyte inlet 54 through which cathode electrolyte fluid is introduced into a cathode fluid flow channel 56. A cathode anion membrane 58 separates cathode fluid flow channel 56 from a salt solution flow channel 60 positioned adjacent cation membrane 32.

A hydrogen outlet 61 through which hydrogen flows from a first hydrogen flow channel 63 is formed by the fuel cell cathode 48 and a first battery endplate 80.

The anode flow compartment 46 is located at a second end of the bipolar stack of membrane flow cells and includes an anode electrolyte inlet 64 through which anode electrolyte fluid is introduced into an anode fluid flow channel 66. An anode cation membrane 68 separates anode fluid flow channel 66 from a salt solution flow channel 70 positioned adjacent anion membrane 20. A hydrogen inlet 82 through which hydrogen is introduced into a second hydrogen flow channel 84 is sandwiched between the fuel cell anode 50 and a second battery end plate 86.

From the above discussion and the illustration of FIG. 1, it can be seen that the salt solution of flow channel 60 is a working fluid of membrane flow cell 10 and the cathode compartment. Similarly, salt solution of flow channel 70 is a working fluid of membrane flow cell 12 and the anode compartment. Finally the salt solution of flow channel 38 is a working fluid for flow cell 10 and flow cell 12. It is contemplated to be within the scope of the present invention to provide stacks of more than three membrane flow cells, wherein salt solutions are working fluids for adjacent stacked flow cells.

Additional battery components include conductive current collector screens 72, 74 positioned on cathode 48 and anode 50, respectively, for collecting charges at the electrodes. The endplates 80 and 86 form the outer walls of the battery and function as the positive terminal and the negative terminal, respectively. Advantageously, the battery of the present invention can be fabricated so that the endplates and conductive current collector screens are the only metal portions. Since there is no flowing electricity within the membrane flow cells, the cells can be fabricated of lightweight polymeric materials. This minimizes corrosion within the cells and provides low density light weight batteries.

Basically, in operation, the battery of the present invention provides electrical current by forcing ions provided by the electrolyte fluids to migrate across selected ion membranes. This movement (represented by wavy horizontal arrows in FIG. 1) generates charge imbalances within the flow cells. The charge imbalances create membrane potentials which are converted to electrical potential and current by reactions at the electrodes. The solvent and salt formed by the interaction of acid and base supplied ions are removed from the cell and can be regenerated to the acidic and basic components for later use. Similarly, spent acidic electrolyte and spent basic electrolyte is removed from the cell and recycled for later use. In ideal circumstances, the entirety of the acidic and basic fluids is consumed, leaving only the salt solution as the spent cell product.

Figure 2:
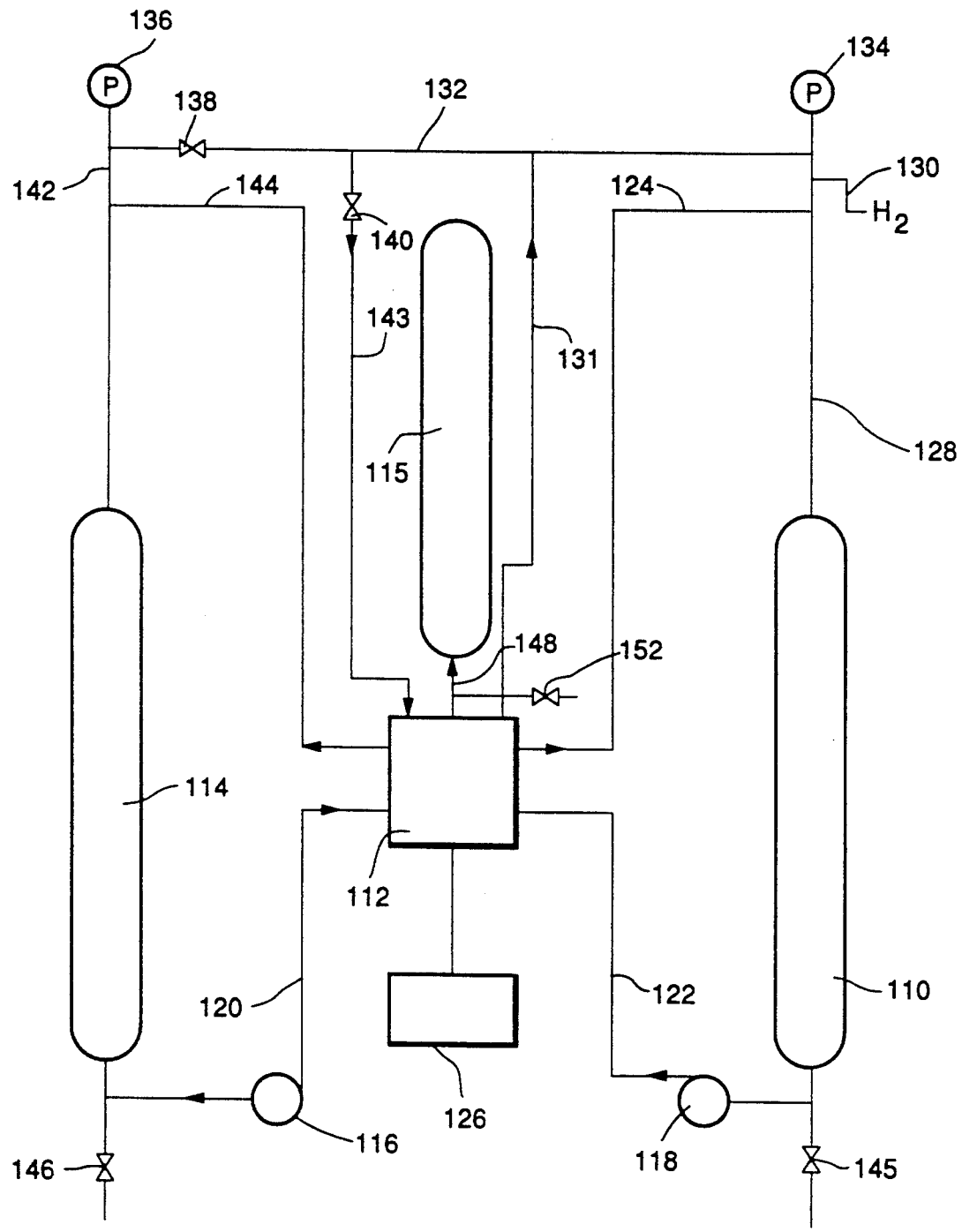
FIG. 2 is a schematic view of a voltage generating system including pumps and holding tanks in accordance with the present invention.

Preferably, the flow cell membrane battery of the present invention is operated in combination with a system of reservoirs, pumps, and valves used for transporting the working fluids and hydrogen. An exemplary system is schematically illustrated in FIG. 2 which shows a flow cell battery, such as that of FIG. 1, at reference numeral 112. Following is a description of the system of FIG. 2 in operation with the battery of FIG. 1, to generate electrical voltage using equal molar amounts of aqueous phosphoric acid and aqueous NaOH as the acidic electrolyte and basic electrolyte fluid, respectively. Referring to FIG. 1 and FIG. 2, aqueous concentrationed $H_3PO_4$, ionizable to $H^+$ and $H_2PO_4^-$, is pumped on demand from reservoir 110 via line 122 to fluid flow channels 16 and 56 via inlets 11 and 54 respectively. Simultaneously, a suitable basic electrolyte, such as aqueous NaOH, ionizable to $Na^+$ and $OH^-$, is pumped from basic electrolyte reservoir 114 via line 120 to fluid flow channels 28 and 66 via inlets 26 and 64, respectively.

Hydroxide ions ($OH^-$) within fluid flow channels 28 and 66 migrate across anion surface membrane 34 of bilayer membrane 24, and protons ($H^+$) migrate across cation surface 22 of bilayer membrane 24. At interface 23 water and a membrane potential are formed by the interaction of $H^+$ and $OH^-$. These migrations and the formation of water and the membrane potential at bilayer membrane 24 simultaneously cause a charge imbalance within fluid flow channels 28 wherein $Na^+$ ions are pushed across cation membrane 32. Similarly, a resulting charge imbalance within fluid flow channels 16 results in $H_2PO_4^-$ ions being pushed across anion membrane 20. Salt in the form of $NaH_2PO_4$ is formed in flow channel 38 as a result of the migration of ions across cation membrane 32 and anion membrane 20. Accordingly, the net cell reaction is as follows:

Acid + Base → Salt + Water + Membrane Potential or $H_3PO_4 + NaOH \rightarrow NaH_2PO_4 + H_2O +$ Membrane Potential The cathode 48 and anode 50 are used to convert the membrane potential to electrical current. The electrodes are in the form of a single pair of hydrogen electrodes and located at either end of the bipolar stack of membrane flow cells as shown in FIG. 1. The cathode reaction is as follows:

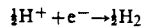

The hydrogen gas produced at the cathode is transported from fluid channel 61, through hydrogen outlet 63 and to transport lines 131 and 132 in FIG. 2. Hydrogen inlet 84 moves the hydrogen from the transport line and into fluid channel 82 where it is consumed at anode 50 in the following reaction:

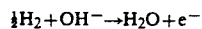

The current produced by this reaction is moved from the system to power an electric vehicle or equipment indicated by numeral 126. The spent basic electrolyte fluid is removed from flow channels 28 and 64 and preferably recycled through line 144 to base reservoir 114. Spent acid flows from battery cell 112 through line 124. The spent acid is preferably transferred to the acidic electrolyte fluid reservoir 110 through line 128. Salt solution is preferably collected from channels 60, 70 and 38 through line 148 and is stored in tank 115 for later use. The hydrogen can be eliminated from the system at 130 or recycled into a hydrogen recycling system through line 132 where it returns to cell 112 via valve 140 and line 143 for consumption at anode 50. Valve 138 is provided for controlling the pressure within line 132 and tanks 110, 114 and 115. Pressure gauges 136 and 134 are provided for monitoring the pressures within the hydrogen recycle lines.

The flow cell battery 112 of the present invention can be recharged by reversing pumps 116 and 118, thereby reversing the fluid flow directions in each of the fluid flow channels, and applying current to the cell, which reverses the membrane cell reactions. Accordingly, the salt and water are converted to the original acidic electrolyte fluid and basic electrolyte fluid. An alternative method for recharging the battery involves removing the fluids from the cell fluid flow channels and tanks and introducing fresh fluids into the system. This latter method is preferred because it requires only minutes to accomplish the recharging task, rather than the several hours required for electrolytic recharging. In this preferred method, during operation, the spent acid and base solutions are recycled to their respective acidic and basic electrolyte reservoirs, as described above and shown in FIG. 2. When all of the fresh electrolyte has been consumed, reservoirs 112, 114 and 115 are full of their respective spent solutions. For recharging the system, valve 145 is provided for draining spent acid solution from reservoir 110 and filling reservoir 110 with fresh acidic electrolyte. Similarly, valve 146 is provided for draining spent base solution from reservoir 114 and filling reservoir 114 with fresh basic electrolyte. Valve 152 is provided for draining salt solution from tank 115. The spent electrolytes may be discarded or retained for later use. When an extended recharge time is available, the spent electrolytes may be returned to the system and recharged back to the fresh state.

The above described system of reservoirs, pumps, and valves provides a means for the flow cell membrane battery of the present invention to generate electricity as long as fresh acidic and basic electrolyte can be introduced into the cell flow channels. Accordingly, the size of reservoirs 110 and 114 is partially determinative of the energy exhibited by cell 112. Acidic reservoirs on the order of 3 liters of acidic electrolyte may be used in combination with a basic electrolyte reservoir having a capacity on the order of 2 liters of a basic electrolyte for each kilowatt-hour of energy storage.

Another factor which contributes to the power and voltage exhibited by cell 112 is the number of membrane flow cells incorporated within the cell. FIG. 1 illustrates a cell which includes a stack of two membrane flow cells and one additional cell provided by the two end electrode compartments. However, it is within the present invention to provide flow cell batteries having a large number of flow cells. By providing a stack of numerous flow cells, greater total membrane potentials are developed which in turn provide greater electrical voltage and power. In fact the generated electrical voltage and the current and power densities are sufficient to power electrical vehicles for extended lengths of time at normal speeds and accelerations.

Additionally, by eliminating an electrode pair for each cell, the high cost associated with hydrogen electrodes for each cell is reduced dramatically. The reduced number of electrodes also provides batteries having much less weight and corrosion producing components.

The choice of basic electrolyte fluid and acidic electrolyte fluid also contributes to the energy density and power density developed by the battery. Acids and bases which are available in highly pure form are more efficiently utilized. Additionally, acids and bases which form highly concentrated solutions provide greater charge density and develop greater membrane potentials. Finally, strong acids and bases are preferred in order to maximize the cell voltage.

Similarly, solvents utilized to form the acidic and basic electrolyte fluids are preferably highly pure and capable of forming concentrated solutions of acid and base. Also, the fluids formed by the acid, base and solvent preferably have high ionic conductivity to maximize the power density of the cell. Those skilled in the art will appreciate that working fluids which include aqueous solutions $H_3PO_4$, NaOH, $NaH_3PO_4$, provide electrolyte fluids and salt solutions of pure compounds in a highly concentrated form and thus are particularly suitable as working fluids in the batteries of the present invention. In fact, related batteries utilizing aqueous solutions of concentrated $H_3PO_4$ and NaOH have been shown to develop a cell voltage of 940 mV and a fluid energy density of 100 watt-hours per kilogram.

Although water is a particularly suitable solvent for forming the electrolyte fluids utilized in the battery of the present invention, higher voltages may be achieved with the use of non-aqueous solvents. For example, sodium ethoxide dissolved in ethanol exhibits stronger base properties than sodium hydroxide. When water is eliminated as a solvent, the generalized flow membrane cell reaction is as follows:

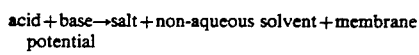

acid + base → salt + non-aqueous solvent + membrane potential

For non-aqueous solvent battery systems, the cathode reaction is the same reaction as previously shown. However, the anode reaction is as follows:

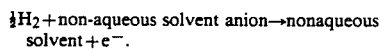

$\frac{1}{2}H_2$ + non-aqueous solvent anion → nonaqueous solvent + $e^-$.

In view of the above, although the present invention has been described with respect to acidic electrolyte fluid of concentrated aqueous $H_3PO_4$ and basic electrolyte of concentrated NaOH, a wide range of working fluids as well as cell geometries is possible. Those skilled in the art will recognize that altering the electrolyte fluids and the number of membrane cells within the stack will vary the power density and current density exhibited by the battery.

Having described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited to the following claims.

What is claimed is:

1. A rechargeable battery for generating electrical potential by acidic fluid electrolytes and basic fluid electrolytes flowing in fluid flow channels between ionic membranes, said rechargeable battery comprising:
   a) a bipolar stack of at least one membrane flow cell, wherein ionic charges moving across said ion membrane provide membrane potentials, said membrane flow cell comprising:
      an acidic electrolyte inlet through which acidic electrolyte is introduced into an acidic fluid flow channel formed by a first surface of an anion membrane and a first surface of bilayer membrane;
      a basic electrolyte inlet through which basic electrolyte fluid is introduced into a basic fluid flow channel formed by a first surface of a cation membrane and a second surface of a bilayer membrane; and
      a salt outlet through which salt solution is transferred from a salt solution fluid flow channel formed by a second surface of said anion membrane and a second surface of said cation membrane;

b) a cathode flow compartment wherein hydrogen gas is generated from said membrane potential, said cathode flow compartment located at one end of said bipolar stack and comprising:
   a cathode electrolyte inlet through which cathode electrolyte fluid is introduced into a cathode fluid flow channel formed by a cathode anion membrane and a fuel cell cathode; and
   a hydrogen outlet through which hydrogen flows from a first hydrogen flow channel formed by said fuel cell cathode and a first battery endplate;

c) an anode flow compartment wherein hydrogen is consumed to form said voltage, said anode compartment located at a second end of said bipolar stack and comprising:
   an anode electrolyte inlet through which anode electrolyte fluid is introduced into an anode fluid flow channel formed by an anode cation membrane and a fuel cell anode; and
   a hydrogen inlet through which hydrogen is introduced into a hydrogen flow channel formed by said anode and a second battery end plate;

d) means for transferring hydrogen from said hydrogen outlet to said hydrogen inlet; and e) means for transferring said electrical potential from said rechargeable battery to an electric load.

2. The rechargeable battery of claim 1 wherein said bipolar stack comprises a plurality of said membrane flow cells.

3. The rechargeable battery of claim 1 wherein said bilayer membrane is a laminate comprising an anion membrane layer and a cation membrane layer.

4. The rechargeable battery of claim 3 wherein said first surface of a bilayer membrane is formed by said cation membrane.

5. The rechargeable battery of claim 3 wherein said second surface of a bilayer membrane is formed by said anion membrane.

6. The rechargeable battery of claim 1 wherein said first battery endplate is a positive battery terminal.

7. The rechargeable battery of claim 1 wherein said second battery endplate is a negative battery terminal.

8. The rechargeable battery of claim 1 wherein said cathode and said anode each further include conductive current collector screens.

9. The rechargeable battery of claim 1 wherein said acidic electrolyte fluid is aqueous phosphoric acid ($H_3PO_4$).

10. The rechargeable battery of claim 1 wherein aid basic electrolyte fluid is aqueous sodium hydroxide (NaOH).

11. The rechargeable battery of claim 1 wherein said salt solution is aqueous sodium phosphate, monobasic ($NaH_2PO_4$).

12. A method for generating electrical potential by producing membrane potentials within membrane flow cells and converting said membrane potential to electrical potential, said method comprising the steps of:
   providing a battery having a bipolar stack of at least two ion membrane flow cells, a fuel cell cathode at a first end of said bipolar stack and a fuel cell anode at a second end of said bipolar stack wherein each said ion membrane flow cell comprises an acidic fluid flow channel and a basic fluid flow channel;
   simultaneously causing acidic electrolyte fluid to enter said ion membrane flow cells through said acidic fluid flow channels and causing basic electrolyte fluid to enter said ion membrane flow cells through said basic fluid flow channels, wherein acidic electrolyte ion and basic electrolyte ions selectively migrate across flow cell ion membranes and react to provide membrane potentials, salt solution, spent acidic electrolyte, and spent basic electrolyte;
   transporting hydrogen produced at said fuel cell cathode through a hydrogen outlet to said fuel cell anode where said hydrogen is consumed to provide electrical potential; and
   transferring said electrical potential from said anode to an electric load.

13. The method of claim 12 wherein said acidic electrolyte fluid enters said ion membrane flow cells by flowing through acidic electrolyte fluid flow channels separated by ion membranes.

14. The method of claim 12 wherein said basic electrolyte fluid enters said ion membrane flow cells by flowing through basic electrolyte fluid flow channels separated by ion membranes.

15. The method of claim 12 wherein said salt solution exits said ion membrane flow cells by flowing through salt solution flow channels separated by ion membranes.

16. The method of claim 12 wherein said membrane potential is generated at at least one bilayer membrane comprising a laminate of cation membrane and anion membrane, wherein said bilayer membrane separates an acidic electrolyte flow channel and a basic electrolyte flow channel, and said membrane potential is generated by hydrogen ions from said acidic electrolyte migrating across said cation membrane and anions from said basic electrolyte migrating across said anion membrane.

17. The method of claim 12 wherein said membrane flow cell battery is recharged by reversing spent acidic electrolyte fluid flow direction, reversing spent basic fluid flow direction, reversing salt solution flow direction and applying current to said membrane flow cell thereby causing said salt solution to form acidic electrolyte fluid and basic electrolyte fluid.

18. The method of claim 12 wherein said membrane flow cell battery is recharged by removing said spent acidic electrolyte fluid, said spent basic electrolyte fluid, and said salt solution from said fluid flow channels and introducing fresh acidic electrolyte fluid and fresh basic electrolyte fluid into said membrane flow cells.

19. The method of claim 18 wherein said removed salt solution is regenerated to provide acidic electrolyte fluid and basic electrolyte fluid.

20. The method of claim 18 wherein said removed spent basic electrolyte, said removed spent acidic electrolyte and said removed salt solution are recycled to acidic electrolyte, basic electrolyte, and salt solution reservoirs located external to said rechargeable battery.

* * * * *